United States Patent [19]

Wilson

[11] 4,317,988

[45] Mar. 2, 1982

[54] AIR BRAKE LEAK LOCATOR

[76] Inventor: Rosser L. Wilson, 103 Armour Rd., Mahwah, N.J. 07430

[21] Appl. No.: 42,498

[22] Filed: May 25, 1979

[51] Int. Cl.³ .................. B60T 17/00; G06M 3/08
[52] U.S. Cl. .................. 235/92 MT; 235/92 T; 235/92 DN; 246/169 R; 303/1
[58] Field of Search .......... 235/92 MT, 92 T, 92 DN, 235/92 TF; 340/52 C; 303/1; 246/169 R

[56] References Cited

U.S. PATENT DOCUMENTS 3,807,808  4/1974  Souther .................. 303/1
4,066,299  1/1978  Clements .................. 303/1

*Primary Examiner*—Joseph M. Thesz

*Attorney, Agent, or Firm*—Harvey B. Jacobson

[57] ABSTRACT

An air flow sensor is disposed in the main supply line of a train air brake system. Circuitry is connected to the sensor and initiates the incrementing of a counter upon the sensing of an air flow rate above a predetermined level for greater than a predetermined length of time. The counting is terminated upon application of the locomotive brakes. The counter thereby produces an indication of elapsed time between the time of an air brake leak occurrence and the time the decrease in pressure is sensed by the locomotive. This indication can be converted to feet based upon speed of travel of the pressure head and divided by the average length of cars in the train to provide an accurate estimate of the location of the leak.

8 Claims, 1 Drawing Figure

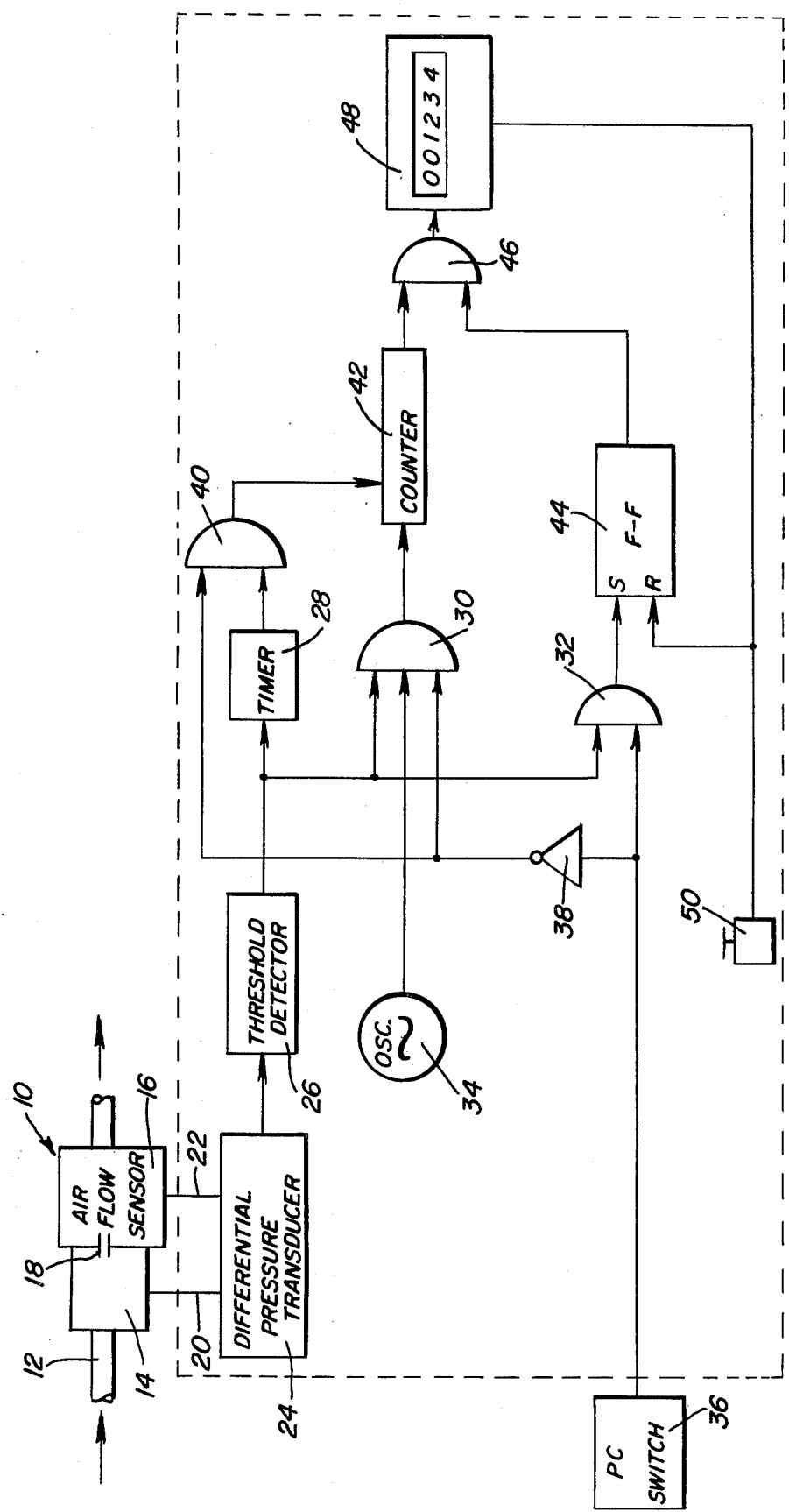

AIR BRAKE LEAK LOCATOR

BACKGROUND OF THE INVENTION

1. Field of the Invention

This invention relates to the air brake systems of railroad freight trains and especially to devices for indicating the location of unwanted air brake leaks.

2. Discussion of Related Art

The standard air brake system of a railroad freight train operates in conjunction with a controlled source of air pressure furnished by a compressor system on the locomotive. Air at regulated pressure is supplied from the locomotive to each car coupled within the train by means of a brake pipe which extends the length of each car. Flexible hoses are provided at the ends of each car and equipped with on/off valves. Flexible hoses at the ends of each car are coupled manually to like hoses on the next car. The flexible hose at the rear of the last car is supported, and the air valve or angle cock is closed to prevent escape of brake pipe supply air pressure to atmosphere. All other air valves or angle cocks are positioned fully open to allow air pressure supply from the locomotive to be present throughout the total length of the brake pipe system.

A branch pipe is connected to each car into the brake pipe with a tee connection. The branch pipe conducts brake pipe supply air to and from the air brake system which consists of valvular portions, reservoirs, air cylinders and a system of rods and levers to transmit force to the brake shoes and hence to the car's wheels.

After the air brake system in each car is fully charged to a predetermined and regulated pressure, the brakes on each car can be operated in response to brake pipe supply pressure changes. When the locomotive operator reduces the brake pipe pressure at a controlled rate, the brakes on each car will apply at a controlled rate and in proportion to the reduction. When the locomotive operator restores the brake pipe pressure to the original regulated value, the brakes on each car will release.

Should the locomotive operator reduce the brake pipe pressure at a rapid rate, the brakes on each car will apply at a faster rate and the total braking force will be increased over normal service braking. As in serivce braking, release of the brakes is accomplished by restoration of the brake pipe pressure to the original regulated charge level. Release of the brakes, following a rapid or emergency application usually requires a longer period. All of this is well-known by train operators and technical maintenance personnel in the railroad industry. The air brake system will operate to apply brakes at each car in the event that the brake system regulated pressure is affected by a leak in the system. Should a leak occur in the system, such as at a loose fitting gasket, flexible hose, or any leak source greater than the capacity of the locomotive regulated air supply, the brakes at each car will operate automatically. Should a sudden leak occur at a rapid rate, the brakes on each car will be automatically applied into emergency application.

Such a rapid lead in the brake pipe system can result from a separation of the brake pipe system, as in the case of the train coming uncoupled, a separated or burst hose or pipe and/or a malfunctioning air brake valvular portion. When the brakes of a train are applied in an emergency, other than when deliberately applied by the locomotive operator, such a brake application is called an "Undesired Emergency Application".

In the event that a train experiences a separation, the source of the brake pipe system opening is readily apparent. Also, if a hose separates or bursts or any other visual leak occurs, the source can be identified upon inspection of the train and repairs can be effected. In the case of a malfunctioning valvular air brake equipment portion on one or more cars being responsible for the undesired emergency brake application, the problem of identifying the particular car or cars is difficult and time consuming and contributes to excessive train delays. Such a malfunctioning valvular portion may repeat the malfunction periodically during train operations, thereby creating a series of repeated undesired emergencies when the brakes have been released and train operation is resumed.

The usual method employed by train crewmen to locate a particular car with a malfunctioning valvular portion is a time consuming process whereby blocks of cars are tested in order to pinpoint the defective car or cars.

U.S. Pat. No. 3,807,808, issued Apr. 30, 1974, to Souther illustrates a typical system, for locating air leaks. The Souther system comprises pressure actuated counters in the first and last cars of a train. Upon an undesired emergency brake application, each counter is activated when a decrease in pressure advances serially through the cars and reaches the counter. The time differential of initiation of the counters is used to determine the location of the leak.

SUMMARY OF THE INVENTION

One object of the present invention is to provide an air brake leak detector which can easily and accurately locate the site of an air brake leak.

A further object of the present invention is to provide an air brake leak detector which utilizes a single counter, which counter provides an indication of elapsed time between the initiation of an air brake leak and the time at which the decreasing pressure has progressed serially through the cars of the train to reach the locomotive.

Another object of the present invention is to provide an air brake leak detector which can be installed in a locomotive that requires no connections or extensions external of the locomotive.

In accordance with the above objects, the present invention provides an air flow sensor which is pneumatically connected into the brake supply system on the locomotive. In the event of an undesired emergency brake application during normal train operation, the sensor will quickly monitor the rate of brake pipe demand. Circuitry connected to the sensor compares the rate of flow to a known demand rate of flow which when measured is an indication of a brake pipe initiated emergency in progress. When the sensed flow rate is equal to or greater than the known demand rate of flow, the output of an oscillator is gated to a counter. The count of the counter increases until the emergency brake application is propagated serially throughout the train and reaches the locomotive. Each locomotive is standardly equipped with a charging cutoff arrangement which functions automatically to cutoff further air pressure supply to the train air brake system and also operates a pressure switch to indirectly unload the electrical propulsion system of the locomotive and to reduce diesel engine RPM to idle speed. The pneumatic electric switch used for this purpose is commonly called a "PC" switch. When the PC switch is operated due to the sensing thereby of the emergency brake condition, the signal therefrom is used to terminate the application of pulses to the counter. The counter output is then transmitted to a display device which visually indicates the elapsed time multiplied by the known speed of wave propagation of the decreasing pressure head. This provides an indication in feet which can be divided by the average length of the cars in the train to indicate the car on which the failure occurred.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

The drawing FIGURE is a schematic representation of the circuitry of the present invention.

DESCRIPTION OF THE PREFERRED EMBODIMENT

Now with reference to the drawing, an air brake leak detector incorporating the principles and elements of the present invention will be described in detail. The system includes an air flow sensor 10 which is connected pneumatically in series in a main supply line 12 of the locomotive main reservoir supply which furnishes air under pressure to the regulating valve arrangement performing the direct function of supplying and the regulating brake pipe pressure for the train air brake system. With modern schedule 26-L locomotive brake equipment, this valve is called the "Relay Valve", whereas with older locomotive equipment, the valve performing a similar function is called the "Feed Valve".

The air flow sensor 10 is constructed with two internal chambers 14 and 16 which are separated by an orifice 18. Air flowing through line 12 enters chamber 14, travels through orifice 18 and exits from chamber 16. Obviously, due to the existence of orifice 18, when an air flow is present in line 12, a pressure differential will exist between chambers 14 and 16. Each chamber 14, 16 includes an additional port which connects the individual chambers through lines 20 and 22, respectively, to differential pressure transducer 24. When the train air brake system is fully charged to a predetermined level, the pressure differential across chambers 14 and 16 of the air flow sensor 10 will be zero. During charging of the train air brake system, a differential in pressure will be present across the chambers, this differential in pressure being a measure of the air flow through the sensor. The greater the air flow through the sensor, the greater the pressure difference across chambers 14 and 16.

Differential pressure transducer 24 provides an analog signal proportional to the air flow supply to the train air brake system to the threshold detector 26. Detector 26 can be a Schmitt trigger, or the like, and is activated at a preset threshold level which is adjusted to a level corresponding with the incipient air flow which is known to be associated with an "in progress" and serial progression of an emergency air brake operation through a train air brake system. Accordingly, during normal air brake operation, the level of output from differential pressure transducer 24 is below that associated with an emergency air brake operation and threshold detector 26 does not activate.

The output of threshold detector 26 is connected to timer 28, AND gate 30 and AND gate 32. The output of an oscillator 34 is also connected to AND gate 30, while the output of PC switch 36 is connected to AND gate 32 and, through inverter 38, to AND gate 30 and 40. AND gate 30 gates pulses from oscillator 34 to counter 42, while AND gate 40 operates to reset counter 42. The output of AND gate 32 serves to set flip flop 44 which functions to gate the output of counter 42 through AND gate 46 to display device 48. A reset switch 50 is also connected to flip flop 44 for resetting that flip flop. Reset switch 50 is further connected to display 48 to reset that display.

In operation, when the air flow through line 12 is equal to the preset threshold determined by detector 26, the rising edge of the output of the threshold detector initiates timer 28. Since the PC switch 36 is inactive at this time, its output is low. The output is inverted through inverter 38 and a high signal is presented to AND gate 40. The function of timer 28, by the way of the falling edge of its output, is to reset counter 42 to zero for all threshold detector 26 output which do not mark the beginning of an emergency air brake operation. The timing length of timer 28 is about 10 seconds, which value exceeds normal emergency brake progression times. The output of timer 28 is also set to zero when the output of the threshold detector 26 goes to zero. Gate 40 inhibits the reset action of timer 28 when the "PC" switch 36 is operated for bona fide emergency brake applications.

When the output of threshold detector 26 is high the inverted output of PC switch 36 is high, the pulses from oscillator 34 are gated through AND gate 30 to counter 42. The oscillator 34 is set at a frequency of 1,000 cycles per second and the counter 42 incremented accordingly. The rate of oscillation of oscillator 34 is set in accordance with the known rate of propagation of a decreasing pressure head as it progresses serially through the cars of a train. Accordingly, the count being stored in counter 42 is indicative of the number of feet advanced by the decreasing pressure head.

As the pressure head progresses outward from the leak site, it moves serially through the cars until it reaches the locomotive. The locomotive brake charging cutoff arrangement operates a pressure switch to indirectly unload the electrical propulsions system of the locomotive. This "PC" switch 36 is connected to the circuitry of the present invention and is adapted to provide a high signal when activated. The high signal is inverted by inverter 38 and thereby presented to AND gate 30 to terminate the incrementing of counter 42. At the same time, this high signal is transmitted through gate 32 and sets flip flop 44. The high output of flip flop 44 conditions AND gate 46 to allow the contents of counter 42 to be transmitted to display device 48. The digital display 48 registers a numerical count in feet as information to the locomotive operator to indicate the origin of the undesired and train brake system initiated emergency brake application. The locomotive and/or train crew member would then consider the train with respect to the number of cars and the nominal length of each car. For example, if the first 70 cars in the train were all 50 feet in length and the display 48 registered 2,750, then the source of the undesired emergency train air brake application would be located in the vicinity of the 55th car. Of course, if desired, a separate presettable divider could be included in the display device to permit this calculation to be done automatically once the length of the cars are known.

Reset 50 resets the display to zero and also resets flip flop 44 to zero upon actuation. Naturally, reset 50 would be actuated after the leak has been located.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a vehicular fluid pressure brake system having a main supply line connected to a plurality of serially connected braking mechanisms, a fluid pressure leak detector for determining the location of a fluid pressure leak in said brake system, said fluid pressure leak detector comprising:
    first sensor means connected in said supply line for producing a first signal indicative of initiation of a fluid pressure leak and being operable in response to an abnormal change in fluid pressure within said brake system;
    second sensor means for producing a second signal operable in response to an actuation of one of said braking mechanisms as a result of said fluid pressure leak;
    elapsed time means connected to said first sensor means and said second sensor means for receiving said first signal and said second signal and providing an indication of time elapsed between the receipt of said first signal and said second signal; and
    time delay means connected to said elapsed time means for delaying receipt of said first signal by said elapsed time means by a predetermined amount to cancel normal brake system charging.

2. The system of claim 1 wherein said first sensor means includes a fluid flow rate sensor, and further wherein said first sensor means includes a threshold means for producing said first signal only when the fluid flow rate is above a predetermined level.

3. The system of claim 2 wherein said fluid flow rate sensor includes a flow restricting orifice and a means for sensing a pressure differential on either side of said orifice.

4. The system of claim 1 wherein said first sensor means is located in the locomotive of a train.

5. The system of claim 1 and further including a visual display means connected to said elapsed time means.

6. In a vehicular fluid pressure brake system having a main supply line connected to a plurality of serially connected braking mechanisms, a fluid pressure leak detector for determining the location of a fluid pressure leak in said brake system, said fluid pressure leak detector comprising:
    first sensor means connected in said supply line for producing a first signal indicative of initiation of a fluid pressure leak and being operable in response to an abnormal change in fluid pressure within said brake system, said first sensor means including a fluid flow rate sensor and further including a threshold means for producing said first signal only when the fluid flow rate is above a predetermined level;
    second sensor means for producing a second signal operable in response to an actuation of one of said braking mechanisms as a result of said fluid pressure leak, said second sensor means including a locomotive PC switch; and
    elapsed time means connected to said first sensor means and said second sensor means for receiving said first signal and said second signal and providing an indication of time elapsed between the receipt of said first signal and said second signal.

7. The system of claim 6 wherein said elapsed time means includes a counter and an oscillator for incrementing said counter.

8. In a vehicular fluid pressure brake system having a main supply line connected to a plurality of serially connected braking mechanisms, a fluid pressure leak detector for determining the location of a fluid pressure leak in said brake system, said fluid pressure leak detector comprising:
    first sensor means connected in said supply line for producing a first signal indicative of initiation of a fluid pressure leak and being operable in response to an abnormal change in fluid pressure within said brake system;
    second sensor means for producing a second signal operable in response to an actuation of one of said braking mechanisms as a result of said fluid pressure leak; and
    elapsed time means connected to said first sensor means and said second sensor means for receiving said first signal and said second signal and providing an indication of time elapsed between the receipt of said first signal and said second signal, and further wherein said first sensor means and said second sensor means are located in the locomotive of a train.

* * * * *